Feb. 2, 1960  R. M. BECK ET AL  2,923,470
DIGITAL DIFFERENTIAL ANALYZER
Filed Dec. 8, 1952  5 Sheets-Sheet 1

INVENTOR.
ROBERT M. BECK
JOSEPH A. BEEK, JR.
GLENN E. HAGEN
CECIL R. RUSSELL
CHARLES R. WILLIAMS
BY
Herbert E. Metcalf
ATTORNEY

Feb. 2, 1960 R. M. BECK ET AL 2,923,470
DIGITAL DIFFERENTIAL ANALYZER
Filed Dec. 8, 1952 5 Sheets-Sheet 2

INVENTOR.
ROBERT M. BECK
JOSEPH A. BEEK, JR.
GLENN E. HAGEN
CECIL R. RUSSELL
CHARLES R. WILLIAMS
BY
ATTORNEY

United States Patent Office 2,923,470
Patented Feb. 2, 1960

2,923,470

DIGITAL DIFFERENTIAL ANALYZER

Robert M. Beck, Inglewood, Joseph A. Beek, Jr., Balboa Island, and Glenn E. Hagen and Cecil R. Russell, Manhattan Beach, and Charles R. Williams, Palos Verdes Estates, Calif., assignors to Northrop Corporation, Hawthorne, Calif., a corporation of California Application December 8, 1952, Serial No. 324,726

15 Claims. (Cl. 235—152)

This invention relates to apparatus for electrically solving differential problems and more particularly to apparatus for obtaining a particular solution of a differential equation involving a relationship between an independent variable quantity $x$ and a dependent variable quantity $y$. The apparatus obtains such a particular solution by initially determining the values of $x$, $y$ and $dy/dx$ at a point in the curve defining the particular solution. The invention also relates to a method of solving differential equations having certain conditions specified as part of the problems.

In co-pending application Serial No. 217,478, filed March 26, 1951, by Floyd G. Steele and William F. Collison, a digital differential analyzer is disclosed for solving complex differential equations by digital steps. The analyzer combines the advantages of both the differential analyzer and the digital computer. It has the advantage of the differential analyzer in that it is relatively simple in construction and operation, and it produces fast and accurate solutions of problems like the digital computer. Because of these advantages, an accurate and reliable analyzer is produced which occupies less space than a desk of normal size.

Sometimes in solving differential equations, it is necessary for the solution to satisfy certain conditions initially specified as part of the problem. For example, it may be desired to find the particular solution of the differential equation $$\frac{d^2y}{dx^2} = ax + e^y + c$$

such that $$\frac{dy}{dx} = -b \text{ at } x = 0$$

and $$y = 0 \text{ at } \frac{dy}{dx} = 0$$

and $a$, $b$ and $c$ are constants. In order to solve the problem satisfactorily, it is necessary to know the value of $y$ when $x=0$ or the value of $x$ when $$\frac{dy}{dx} = 0$$

Until now, no apparatus has existed for automatically finding such initial conditions as the value of $y$ when $x=0$ or the value of $x$ when $$\frac{dy}{dx} = 0$$

Because of this, a particular solution of many differential problems could not be obtained when a complete set of conditions, such as the values for $y$, $x$ and $$\frac{dy}{dx}$$

in the above problem, was not available at any point of the particular solution.

This invention provides a digital differential analyzer which is capable of completing a set of conditions at one of two incompletely defined points as a prerequisite to obtaining a particular solution of a problem satisfying the conditions specified for the two points. After obtaining a complete set of conditions at one of the two points, the analyzer utilizes these conditions to obtain the specified particular solution of the differential problem. The analyzer operates in a straightforward and reliable manner to obtain a complete set of conditions for a point and to provide a correct solution of the problem after the complete set of conditions has been determined.

An object of this invention is to provide a digital differential analyzer for solving differential problems by digital steps.

Another object is to provide apparatus of the above character for completing a set of conditions at one of two incompletely defined points as a prerequisite to obtaining a particular solution fully satisfying the conditions specified at the two points.

A further object is to provide a digital differential analyzer of the above character which is capable of systematically adjusting, through successive computations, the initial values of the different quantities involved in the solution of a problem until the desired initial values are obtained.

Still another object is to provide a digital differential analyzer of the above character for determining and storing the initial values of the different quantities involved in the solution of a differential problem so that these values may be utilized in the final solution of the problem.

A still further object is to provide a method of automatically determining the initial values of different quantities involved in the solution of a problem so as to obtain a solution satisfying all of the conditions specified as part of the problem.

Other objects and advantages will be apparent from a detailed description of the invention and from the appended drawings and claims.

Figure 1:
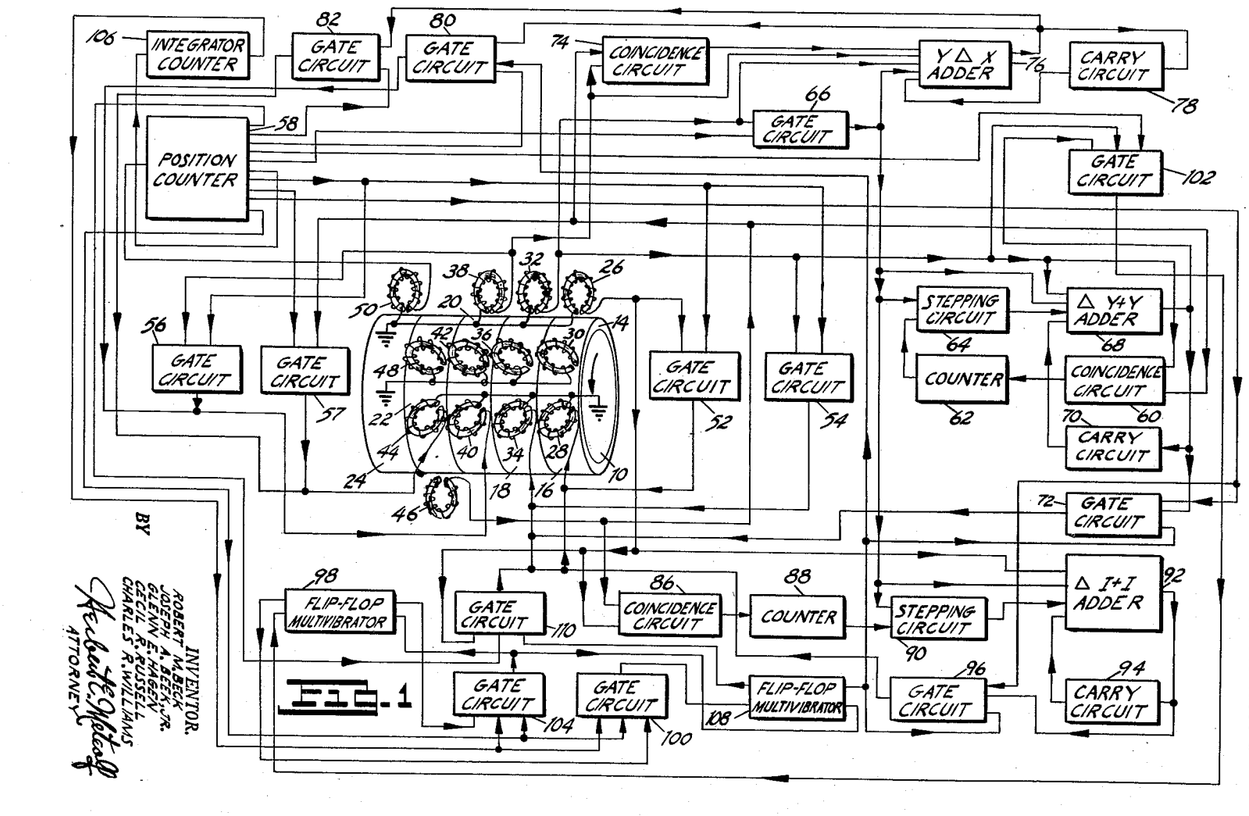
Figure 1 is a circuit diagram, partly in block form and partly in perspective, schematically illustrating a digital differential analyzer constituting one embodiment of the invention.

The digital differential analyzer shown in Figure 1 is adapted to solve differential problems by digital steps. The analyzer includes a drum 10 adapted to be rotated by a suitable motor (not shown). A thin coating 14 of magnetic material is applied on the periphery of the drum. The coating 14 can be considered as being divided into a plurality of channels 16, 18, 20, 22 and 24, each of which completely encircles the drum.

The circumferential distance of each channel may be considered as being subdivided into a plurality of positions. Each of the positions is sufficiently separated from its adjacent positions to receive a different magnetization than that provided on the adjacent positions. For example, approximately 1,160 equally spaced pulse positions may be provided in each channel when the drum has a radius of approximately 4 inches.

A plurality of toroidal coils are positioned adjacent to each of the channels 16, 18, 20, 22 and 24. Thus, coils 26, 28 and 30 are provided in contiguous relationship to the channel 16. Similarly, coils 32, 34 and 36; coils 38, 40 and 42; and coils 44, 46 and 48 are associated with the channels 18, 20 and 22, respectively. A single coil 50 is disposed adjacent the channel 24.

The coils 26 and 28 are effectively separated from each other by approximately 104 pulse positions, and the coil 30 is disposed at an intermediate position between the coils 26 and 28. The coil 28 is adapted to produce signals in a pattern dependent upon the operation of the differential digital analyzer and to produce a corresponding magnetic pattern on the drum 10 as the drum rotates. The pattern produced on the drum 10 by the coil 28 is of the binary form in which one polarity of magnetization indicates one value and the other polarity of magnetization indicates a second value. The coil 26 is adapted to pick up the changes in polarity of magnetization in adjacent positions on the drum and to produce signals indicating the changes of polarity. The coil 30 is adapted to produce a substantially constant signal for returning the polarity of magnetization on the drum to one of the two values after the magnetic pattern on the drum has been converted into a corresponding electrical pattern by the coil 26.

Similarly, the coils 34, 40 and 44 are adapted to provide a magnetic pattern in the channels 18, 20 and 22, respectively, in a pattern dependent upon the operation of the apparatus shown in Figure 1 in solving a particular problem. The coils 32, 38 and 46 are adapted to produce signals in accordance with the magnetic pattern provided in their respective channels by the coils 34, 40 and 44. The coils 36, 42 and 48 are adapted to operate in a manner similar to the coil 30 to produce a constant polarity of magnetization in the channels 18, 20 and 22, respectively, after the patterns provided by the coils 34, 40 and 44 have been utilized by the coils 32, 38 and 46, respectively. The coil 50 is adapted to produce a cycle of a signal approximating a sine wave as each pulse position in the channel 24 moves past the coil. The coil 50 produces a pattern of sine waves because of the magnetic pattern permanently provided in the channel 24. This pattern remains constant regardless of the problem to be solved.

The coils 32, 34 and 36 and the coils 38, 40 and 42 are effectively separated from one another by spacings similar to those provided between the coils 26, 28 and 30. For reasons which will be disclosed in detail hereafter, the coils 44 and 46 are effectively separated from each other by approximately 49 pulse positions during the operation of the analyzer to obtain the solution of a problem.

Gate circuits 52, 54, 56 and 57 are connected between the coils 26 and 28, the coils 32 and 34, the coils 38 and 40, and the coils 46 and 44, respectively. The periods of time for the opening of the gate circuits 52, 54, 56 and 57 are controlled by output signals from a counter 58. The coils 32 and 46 are also connected to the input terminal of a coincidence circuit 60 having its output terminal connected to the input terminal of a counter 62. The output from the counter 62 is in turn introduced to an input terminal of a stepping circuit 64. A second input terminal of the circuit 64 is connected to the output terminal of a gate circuit 66 having its input terminals connected to the coil 32 and to an output terminal of the counter 58.

An input terminal of an adder 68 is connected to the output terminal of the stepping circuit 64, and other input terminals of the adder are connected to the coil 32 and to the output terminals of the gate circuit 66 and of a carry circuit 70. Connections are made from the output terminal of the adder 68 to the input terminal of the carry circuit 70 and to an input terminal of a gate circuit 72, another input terminal of which is connected to the counter 58. The output from the gate circuit 72 is applied by the coil 34 as a magnetic pattern on appropriate pulse positions in the channel 18.

Just as the output signals from the coils 32 and 46 are applied to the coincidence circuit 60, output signals from the coils 38 and 46 are introduced to a coincidence circuit 74. The coincidence circuit 74 and the gate circuit 66 provide controls over the operation of an adder 76 similar to the adder 68. In accordance with the controls provided by the coincidence circuit 74 and the gate circuit 66, the adder 76 arithmetically combines pulses introduced to it from the coils 32 and 38 and from a carry circuit 78, as will be disclosed in detail hereinafter. The adder 76 in turn introduces signals to the carry circuit 78 and to a pair of gate circuits 80 and 82, which also have control signals introduced to them from the counter 58. The output signals from the gate circuits 80 and 82 are applied to the coils 40 and 44, respectively. In like manner, the output signals from the coils 26 and 46 are introduced to a coincidence circuit 86. The output terminal of the coincidence circuit 86 is connected to the input terminal of a counter 8 similar to the counter 62, and the output terminal of the counter 88 is connected to an input terminal of a stepping circuit 90 similar to the stepping circuit 64. A second input terminal of the stepping circuit 90 is connected to the output terminal of the gate circuit 66. The output from the stepping circuit 90 is applied to an input terminal of an adder 92 having other input terminals connected to the coil 26 and to the output terminals of the gate circuit 66 and of a carry circuit 94.

The output terminal of the adder 92 is in turn connected to the input terminals of the carry circuit 94 and of a gate circuit 96. Other input terminals of the gate circuit 96 are connected to the counter 58. The adder 92 and the circuits 94 and 96 are substantially similar to the adder 68 and the circuits 70 and 72, respectively. Connections are made from the output terminals of the gate circuit 96 to the coil 28.

The plate of the left tube in a flip-flop multivibrator 98 is connected to an input terminal of a gate circuit 100. The grid of the left tube in the multivibrator 98 has signals applied to it from the output terminal of a gate circuit 102, input terminals of which are connected to the coil 32, to the counter 58 and to the output terminal of the adder 68. Connections are made from the plate and grid of the right tube in the multivibrator 98 to input and output terminals, respectively, of a gate circuit 104.

In addition to the connections from the multivibrator 98 disclosed above, the gate circuits 100 and 104 have input terminals connected to suitable terminals of the counter 58 and of a counter 106. The output from the gate circuit 100 is applied to the grid of the left tube in a flip-flop multivibrator 108 having its plate connected to an input terminal of a gate circuit 110. The output from the gate circuit 104 is applied to the grid of the right tube in the multivibrator 98 and to the grid of the right tube in the multivibrator 108. The plate of the right tube in the multivibrator 108 is connected to input terminals of the gate circuits 72, 80 and 96. In addition to having an input terminal connected to the plate of the left tube in the multivibrator 108, the gate circuit 110 has other input terminals connected to the coil 26 and the counter 58. The output from the gate circuit 110 is applied to the coils 28 and 34.

As previously disclosed, the magnetic pattern in the channel 24 differs from the pattern in the other channels in that it is permanently recorded in its channel. The magnetic pattern in the channel 24 is in the form of a sine wave, with each cycle of the sine wave being disposed in a successive pulse position in the channel. The counter 58 is adapted to count the cycles of the sine waves in channel 24 as the drum 10 rotates, since it is formed from a plurality of multivibrators connected in cascade arrangement. For example, the counter 58 counts successive sine waves in a range from "1" to "48" and upon each count of "48" returns to its original state to initiate a new count.

Similarly, the counter 106 is formed from a plurality of multivibrators in cascade arrangement. The counter 106 is associated with the counter 58 to count the number of times that a full count is obtained in the counter 58. For example, the counter 106 may count up to 22 full counts in the counter 58 before returning to a count of "1" for the initiation of a new count. In this way, the counters 58 and 106 divide the channels of the drum 10 into 22 integrator storage sections having 48 pulse positions.

The digital differential analyzer disclosed above is adapted to provide the solution of differential equations. For example, it may provide the solution for a general equation $y=f(x)$ so as to obtain a function $\int y dx = \int f(x) dx$, where $f(x)$ represents a function of $x$ and $\int f(x) dx$ represents the integral of the function. If a curve $y=f(x)$ is plotted with $x$ as the abscissa and $y$ as the ordinate, the analyzer obtains the relationship $\int y dx = \int f(x) dx$ by computing the area under the curve $y=f(x)$. By determining the area under the curve $y=f(x)$, the analyzer performs electronically operations that may sometimes be performed mentally by a skilled mathematician when the problem to be solved is relatively simple.

Figure 3:
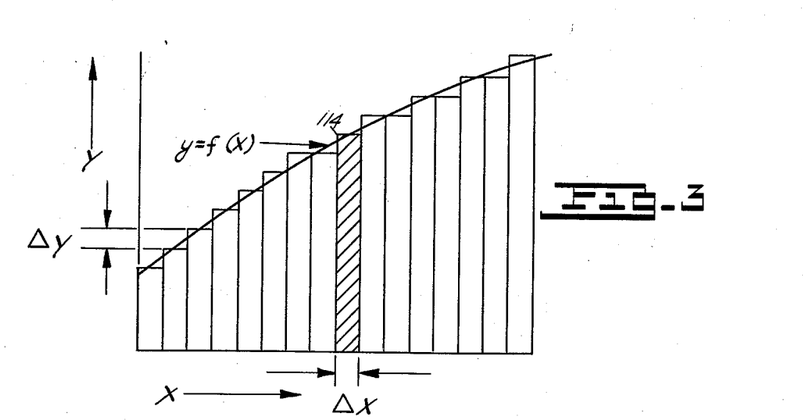
Figure 3 is a curve schematically illustrating the operation of the integrator shown in Figure 2.

The analyzer obtains the value of the function $\int y dx = \int f(x) dx$ by producing small increments of $x$. These increments may be represented by the symbol $\Delta x$. For each $\Delta x$ increment, the analyzer determines the value of $y$ and obtains the product $y\Delta x$. This product $y\Delta x$ represents the area under the curve $y=f(x)$ for each $\Delta x$ increment, as indicated in Figure 3 by the shaded area 114 for a particular $\Delta x$ increment. If the product $y\Delta x$ is obtained for successive $\Delta x$ increments and if all of the $y\Delta x$ increments are added together, the area under the interval of the curve representing $f(x)$ from $x_0$ to $x$ may be approximated. The approximation may be as close to the actual value as desired by decreasing the value of each $\Delta x$ increment.

Figure 2:
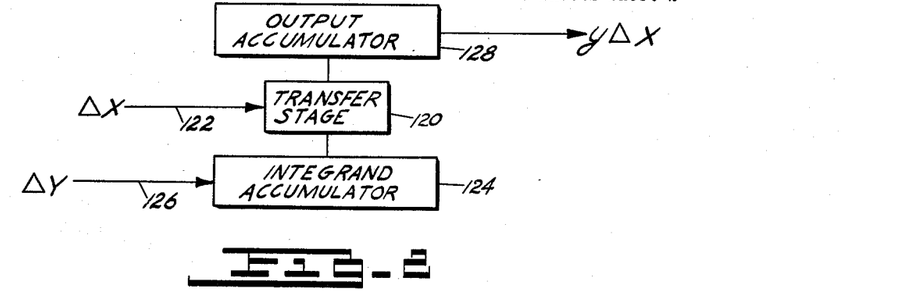
Figure 2 is a block diagram schematically illustrating the operation of one of the integrators forming a part of the digital differential analyzer shown in Figure 1.

An integrator for determining the $y\Delta x$ increments and for storing the cumulative values of these increments is shown in Figure 2. The integrator includes a transfer stage 120 for obtaining $\Delta x$ increments at periodic intervals through a line 122. The integrator also has an integrand accumulator 124 for storing the value of the dependent quantity $y$ for the integrator and for receiving through a line 126 $\Delta y$ increments from its own and from other integrators so as to vary the value of $y$ in accordance with the function $y=f(x)$. An output accumulator 128 is provided to receive $y\Delta x$ increments, to combine each $y\Delta x$ increment with the previous increments and to store the cumulative value obtained. As will be disclosed in detail hereafter, the output from the accumulator 128 may be introduced to the integrand accumulator 124 of its own and of other integrators to produce the $\Delta y$ increments for these accumulators.

Figure 6:
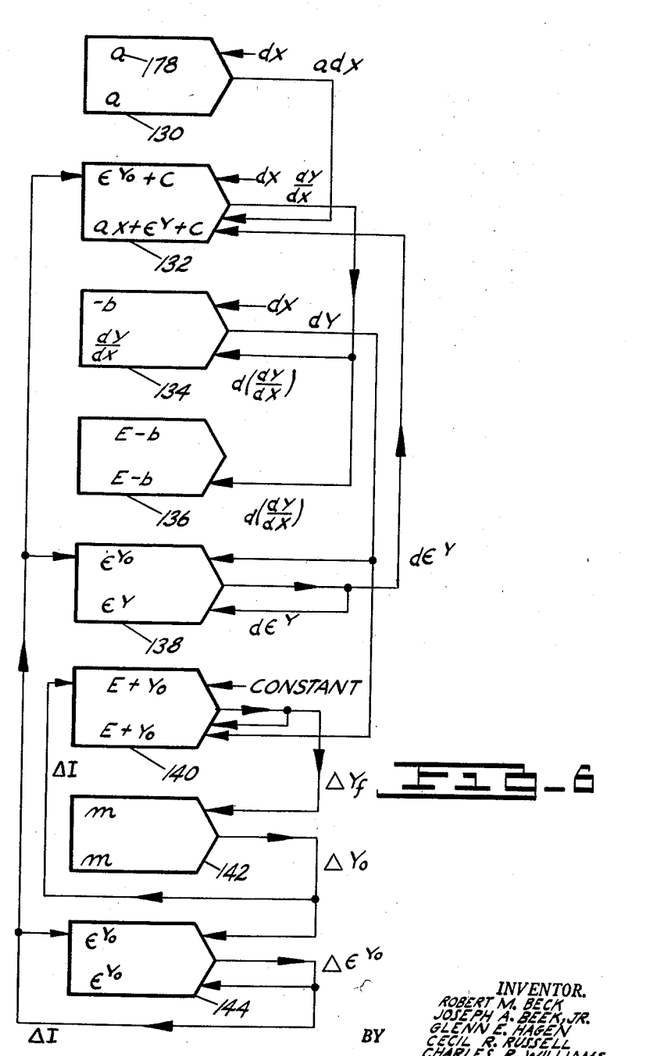
Figure 6 is a schematic diagram indicating the relationship between some of the integrators forming the digital differential analyzer shown in Figure 1 when the analyzer is solving a particular problem.

The interrelationship between different integrators is illustrated in Figure 6 for a particular problem represented by $$\frac{d^2y}{dx^2} = ax + e^y + c$$

where $a$ and $c$ are constants and $$\frac{dy}{dx} = -b \text{ at } x=0$$

and $$y=0 \text{ at } \frac{dy}{dx}=0$$

The integrators involved in the solution of this problem are indicated in Figure 6 by blocks 130, 132, 134, 136, 138, 140, 142 and 144. In each integrator, the introduction of the $\Delta x$ increments constituting the independent variable for the integrator is indicated by a line extending into the upper part of the block at the right side of the block. The $\Delta y$ increments are introduced into the integrator through a line or a plurality of lines extending into the lower right portion of the block representing the integrator. The output of the integrator is obtained from a line extending from an intermediate position at the right side of the appropriate block.

As will be seen in Figure 6, $\Delta x$ increments in the independent variable for a particular integrator may be obtained from the output of another integrator. For example, in Figure 6, the $\Delta x$ increments for the integrator 138 are obtained from the output of the integrator 134. Similarly, $\Delta y$ increments for a particular integrator may be obtained from the output of other integrators as well as from the output of the integrator itself. For example, $\Delta y$ increments for the integrator 140 are obtained from the output of the integrator 134 and from its own output.

Figure 4:
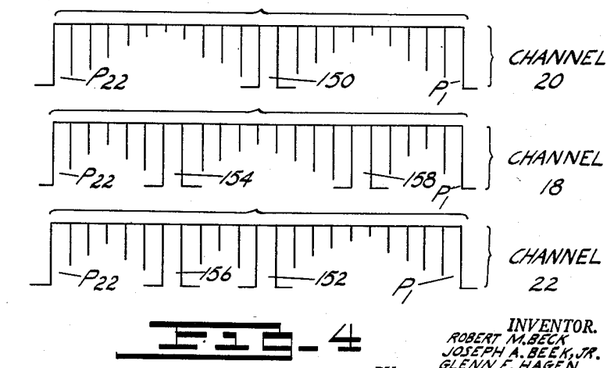
Figure 4 is a diagram which illustrates the manner in which the integrator shown in Figure 2 may be coded to solve a particular problem.

The $\Delta x$ and $\Delta y$ increments for each integrator are actually determined from a coded pattern provided in the channels 20 and 18, respectively. As previously disclosed, the pulse positions in each channel are subdivided into 22 integrator storage sections each having 48 pulse positions. The first 22 positions in each integrator storage section in the channel 20 are coded to indicate a $\Delta x$ increment. Since the first 22 positions in the channel 20 for each integrator storage section correspond in number to the 22 integrators in the analyzer, the pulse representing $\Delta x$ for each integrator is recorded in a particular position in the channel 20. This position corresponds to the particular integrator storage section from which the $\Delta x$ increments are obtained. For example, the $\Delta x$ increments for the integrator 138 in Figure 6 would be coded in a particular one of the 22 positions in the channel 20 corresponding to the time at which the output from the integrator 134 appears on the coil 46. In Figure 4, a pulse 150 is shown as being recorded in the channel 20 in the 11th pulse position for a particular integrator.

A pulse in the channel 20 in one of the first 22 positions for a particular integrator indicates that a $\Delta x$ increment is to be made, but it does not indicate whether the increment is positive or negative. The sign of the increment is indicated by the presence or absence of a coincidental pulse in the channel 22. If a pulse is picked up from the channel 22 by the coil 46 at the same time as the pulse indicative of $\Delta x$ for a particular integrator is picked up by the coil 38, the $\Delta x$ increment for the integrator is positive. For example, the pulse 150 in Figure 4 indicates a positive $\Delta x$ increment since it coincides in time with a pulse 152 in the channel 22. The $\Delta x$ increment is negative if a pulse does not appear in the channel 22 at the same time as the pulse in the channel 18.

In like manner, $\Delta y$ increments for a particular integrator are represented by pulses appearing in the channel 18 in the first 22 positions for the integrator storage section. Each pulse represents a $\Delta y$ increment but does not indicate the sign of the increment. The sign of the increment is indicated by the presence or absence of a pulse in the channel 22 at the time that the pulse in the channel 18 is made available to the coil 32. For example, a pulse 154 in Figure 4 indicates a positive $\Delta y$ increment for a particular integrator since it coincides in time with a pulse 156 in the channel 22. However, a pulse 158 indicates a negative $\Delta y$ increment since there is no coincidental pulse in the channel 22.

The first 22 positions in the channel 18 for each integrator storage section correspond to the 22 integrators in the digital differential analyzer. Because of this, each integrator is coded in particular ones of the first 22 positions in the channel 18 so as to receive the outputs from its own integrator and/or from certain other integrators in accordance with the problem to be solved. For example, a pulse would be coded in the channel 18 in a particular one of the first 22 positions of the integrator storage section 136 so as to coincide with the time at which the output from the integrator 132 is made available to the coil 46 in the channel 22. Although only one $\Delta x$ increment can be obtained for an integrator upon each revolution of the drum, several $\Delta y$ increments can be obtained. This may be seen from Figure 6 where $\Delta y$ increments are introduced to the integrator 132 from both the integrators 130 and 138 every time that the integrator 132 is made available for computation. It may be also seen in Figure 4 by the pulses 154 and 158 in the channel 18.

Since the interrelationship between the different integrators remains constant during the solution of a particular problem, the coding pulses in the channels 18 and 20 for the first 22 positions of each integrator storage section must be retained during the computation. Retention of the pulses in the channel 18 is provided by the gate circuit 54. This gate circuit is opened by a signal from the counter 58 at the first pulse position in each integrator storage section, and it remains open so that subsequent information up to and including the 22nd pulse position of the integrator storage section can pass to the record coil 34. Similarly, the gate circuit 56 opens at the first pulse position for each integrator storage section and remains open until after the 22nd pulse position of the integrator storage section for the passage of coded information to the record coil 40.

Since a plurality of $\Delta y$ increments may be obtained for each integrator every time that the integrator is made available for computation, members are provided in the analyzer to determine the resultant value of the increments. For example, if 4 positive $\Delta y$ increments and 1 negative $\Delta y$ increment are all obtained for an integrator when the integrator is made available at a particular time for computation, the resultant $\Delta y$ increment for the integrator would be $+3$. The resultant $\Delta y$ value for each integrator during every computation is obtained by the coincidence circuit 60 and the counter 62.

The circuit 60 determines the sign of each $\Delta y$ increment by noting whether or not a pulse is picked up in the channel 22 by the coil 46 at the same time that a coding pulse is picked up in the channel 18 by the coil 32. The counter 62 counts the positive and negative $\Delta y$ increments for each integrator to obtain the resultant value of $\Delta y$. The counter 62 includes a plurality of multivibrators connected in cascade arrangement to indicate in binary form the resultant value of $\Delta y$ for each integrator. For example, with a resultant count of $+5$ for $\Delta y$, the first and third multivibrators in the cascade arrangement may be operated to indicate a binary pattern of 101, where the least significant digit is at the right. In binary form, a pattern of 101 indicates that $(1)(2^2)+(0)(2^1)+(1)(2^0)=(5)$.

The resultant value of $\Delta y$ stored in the counter 62 for each integrator is made available on a step-by-step basis by the circuit 64, which feeds the information sequentially into the adder 68. For example, when the resultant value of $\Delta y$ for a particular integrator is $+5$, the circuit 64 indicates a value of $+1$ upon the rotation of the drum 10 past the pulse position which indicates the least significant digit representing the value of $y$. This corresponds to the value of the least significant digit in the binary indication of $+5$. As the drum rotates past second and third pulse positions, the circuit 64 indicates values of 0 and 1, respectively.

The stepping circuit 64 operates to pass in sequence the binary indications in the counter 62 only after it has been triggered by a pulse passing through the gate circuit 66. The gate circuit 66 is so connected to the counter 58 that it cannot open for the passage of a triggering signal until after the 22nd pulse position in the channel 18 for each integrator. When the first pulse appears in the channel 18 for an integrator after the initial 22 pulse positions for the integrator, the gate circuit 66 is opened by a signal from the counter 58 for the passage of a triggering signal.

The signal passing through the gate circuit 66 for an integrator not only triggers the circuit 64 into operation but also triggers the adder 68. The adder 68 then receives binary indications of the value of $y$ for the integrator and arithmetically combines these indications with the values of $\Delta y$ passing through the circuit 64. The arithmetical combination of the values of $y$ and $\Delta y$ are obtained for each pulse position in sequence as the drum rotates. For example, the arithmetical combinations of the indications of $y$ and $\Delta y$ in the 25th pulse position for a particular integrator may be first obtained. The arithmetical combination of the values of $y$ and $\Delta y$ may thereafter be sequentially obtained for the 26th, 27th and the following pulse positions for the integrator.

Sometimes, upon the arithmetical combination of the values of $y$ and $\Delta y$ for a particular pulse position, the adder 68 may obtain a full binary indication of $+2$. In the binary form, an indication of $+2$ is equivalent to a value of 0 for the pulse position and a carry of $+1$ to the next highest binary digit. For example, if a binary indication of $+1$ for $y$ in the 26th position is added to a binary indication of $+1$ for $\Delta y$ in the same position, the resultant value may be 0 in the 26th position with a carry of $+1$ into the 27th position. This carry is provided by the circuit 70.

By arithmetically combining the values of $y$ and $\Delta y$ and the carry indications for each pulse position, a new value of $y$ is obtained. The new indication of $y$ for each pulse position passes sequentially through the gate circuit 72 and produces a corresponding signal pattern in the coil 34. This signal pattern causes the coil 34 to record in the channel 18 the new value of $y$ for each pulse position. The information relating to the new value of $y$ is subsequently utilized by the adder 68 as the information moves past the coil 32, and it is thereafter erased by the coil 36.

In addition to controlling the operation of the adder 68, the gate circuit 66 also controls the operation of the adder 76. Because of the control exerted by the gate circuit 66, the adder 76 is able to operate only in the pulse positions indicating the numerical value of $y\Delta x$ for each integrator and not in the first 22 positions for each integrator. The adder 76 arithmetically combines each incremental value of $y\Delta x$ for a particular integrator with the sum of the incremental values of $y\Delta x$ previously obtained for that integrator. As will be disclosed hereinafter, the sum of the incremental values of $y\Delta x$ previously obtained for each integrator is represented by information in the channels 20 and 22.

The addition or subtraction of each $y\Delta x$ increment for a particular integrator to or from the sum of the $y\Delta x$ increments previously obtained for the integrator is determined by the sign of $y$ as well as by the sign of $\Delta x$. The sign of $y$ for a particular integrator is determined by the presence or absence of a pulse in the 47th pulse position in the channel 18 for that integrator. When the value of $y$ is positive, a pulse is provided in the 47th position. However, no pulse is provided in the 47th position in the channel 18 for a particular integrator when the value of $y$ for that integrator is negative.

As previously disclosed, the value of $\Delta x$ is determined by the coincidence between a pulse in the first 22 positions in the channel 20 for a particular integrator and a pulse in the channel 22. This determination is made by the coincidence circuit 74. The coincidence circuit 74 indicates that the value of $\Delta x$ is positive for a particular integrator when the coil 46 picks up a pulse in the channel 22 at the same time that the coil 38 picks up a coding pulse for the integrator in the channel 20. When no pulse appears in the channel 22 at the same time as the appearance of the coding pulse in the channel 20, the coincidence circuit 74 indicates that Δx is negative.

Upon an indication by the coincidence circuit 74 that the sign of Δx is positive, the circuit makes no change in the indications provided for the value of y. However, for negative indications of Δx for a particular integrator, the circuit 74 changes the value of y into its complementary form. For example, when the value of y for a particular integrator is positive, the circuit 74 changes this value into a corresponding negative value upon an indication by the circuit that the sign of Δx is negative. A change in the value of y is equivalent to transferring the negative sign from Δx to y, since $(y)(-\Delta x)=(-y)(\Delta x)$.

A change in the value of the dependent quantity y from a positive to a negative value is accomplished by reversing the indication of y in each pulse position and by adding a value of 1 to the least significant position indicating the y value. For example, an indication of 101 representing a value of +5 is converted into an indication of 011 representing a value of −5 by reversing the indication 101 into an indication of 010 and by adding a one to the least significant digit. As previously disclosed, the least significant digit in the above example is at the extreme right, and the significance of the digit advances with digital movements to the left. The sign of the dependent quantity y is also changed by converting the indication of 1 in the 47th position into an indication of 0. Although an indication of 011 represents a negative value of −5 when no pulse appears in the 47th pulse position, it would also represent a positive value of +3 when a pulse appears in the 47th position.

Since 5 is the octal complement of 3, it may be seen from the above example and from other examples that the conversion of a positive number into a negative number is obtained by producing the octal complement of the number and by changing in the 47th position the indication of the sign. Because of the fact that subtracting 5 from a number is equivalent to adding 3 in the octal system, it will be seen that the conversion of a positive number into its complementary negative value provides the correct result when the number is arithmetically combined with the number in the channel 20.

Just as the adder 68 combines the indications of y and Δy for each pulse position on a sequential basis, the adder 76 combines the indications of a particular yΔx increment with the sum of the previous yΔx increments on a sequential basis. In this way, a new indication is obtained of the integrated value of yΔx for all increments of this function, including the increment being presented for computation. The new indication of the integrated value of yΔx passes through the gate circuit 80, which opens after the 22nd pulse position for each integrator as a result of signals from the counter 58. The new indications of the sum of the yΔx increments in each pulse position pass to the coil 40 for recordation in the channel 20.

It may sometimes happen that a full indication is provided in the channel 20 to indicate the sum of the yΔx increments for a particular integrator. For example, for a positive sum of yΔx increments for a particular integrator, such a full indication is provided by a pulse in each of the pulse positions representing the sum of yΔx increments. If a positive yΔx increment for the particular integrator is subsequently added to the indication already in the channel 20 for the integrator, an overflow is obtained. This overflow causes the indications in the channel 20 for the particular integrator to return to a relatively low value for the initiation of a new count. For example, if a positive number such as 596 is indicated in binary form in the channel 20 for a particular integrator and if the maximum indication that can be provided is 600, the addition of a value of +10 causes the indication in the channel 20 to return to a value of +6. At the same time, the adder 76 produces a pulse at the 48th position for the particular integrator.

The pulse produced by the adder 76 at the 48th position for each integrator passes through the gate circuit 82 for recordation by the coil 44 in the channel 22. The gate circuit 82 is opened by the counter 58 at the 48th pulse position for each integrator because of the particular connections made from the counter to the gate circuit. In like manner, the coil 44 provides a recordation in the channel 22 of any overflow in the channel 20 for each of the 22 integrators in the analyzer.

Just as the positive pulse from the adder 76 at the 48th position for a particular integrator indicates a positive overflow of the value of yΔx available for storage in the channel 20, a lack of a pulse from the adder 76 at this position indicates a negative overflow. The production of no pulse at the 48th position for the integrator indicates a negative overflow since a negative number is indicated by complementing the indications of a corresponding positive number. For example, by this complementation, a relatively high positive number indicated by a pulse in each available pulse position is indicated as a negative number of corresponding magnitude by the lack of a pulse in each position, except for the position indicating the least significant binary digit.

As previously disclosed, the coils 44 and 46 are effectively separated from each other by 49 pulse positions. Since the length of each integrator is only 48 positions, a precessing action occurs in the channel 22. This precessing action causes a pulse position to be made available in the channel 22 so that the overflow information in the channel 20 in the 48th pulse position for each integrator can be recorded after the computation has been made for the integrator. This may be seen in the chart shown in Figure 5.

Figure 5:
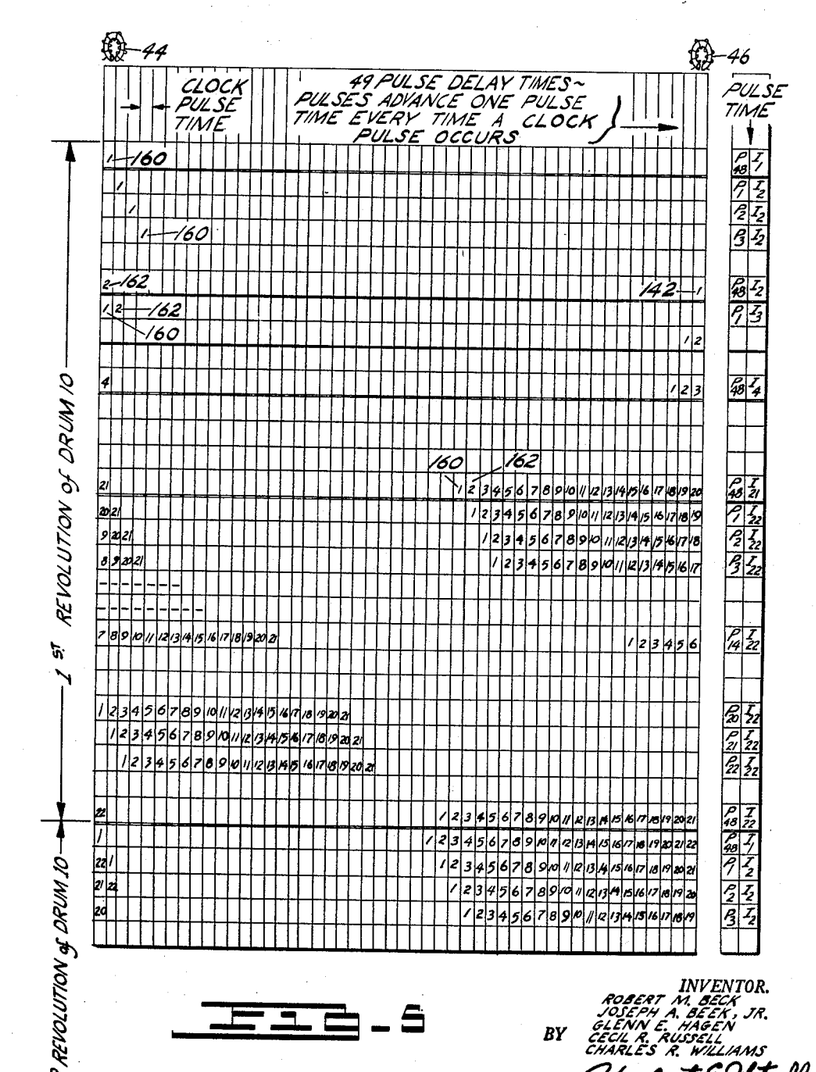
Figure 5 is a chart illustrating in detail the operation of certain components shown in Figure 1.

In all of the vertical columns in the chart shown in Figure 5 except for the two at the extreme right, numbers between "1" and "22" are shown corresponding to the 22 integrators in the digital differential analyzer. In the two vertical columns at the extreme right, numbers are shown prefaced by the letters "I" and "P." The letter "I" followed by a number indicates the particular integrator that is moving past the coil 44 at any instant. For example, "$I_3$" indicates that a pulse position in the 3rd integrator storage section is moving past the coil 44. Similarly, a designation such as "$P_{13}$" indicates that the 13th pulse position in the particular integrator storage section is moving past the coil 44.

As will be seen at 160 in Figure 5, a first indication is provided at the 48th position of Integrator "1." This indication advances from the coil 44 towards the coil 46 as the drum 10 rotates through the 48 positions of Integrator "2." At the 48th position of Integrator "2," an indication is recorded by the coil 44 to indicate any overflow from Integrator "2," as shown at 162 in Figure 5. At pulse position 1 of Integrator "3," the indication 160 passes through the gate circuit 57 to the coil 44 and is again recorded in the channel 22, this time at the pulse position adjacent to the indication 162.

Similarly, indications are provided in adjacent pulse positions to show whether or not an overflow has occurred in the cumulative value of yΔx for each of the other integrators in the analyzer. These indications are recirculated by the gate circuit 57, which remains open during the first 47 positions of each integrator. At the 48th pulse position for each integrator, the gate circuit 57 closes and prevents any recirculation of old information. At the same time as the gate circuit 57 closes, the overflow indication for the integrator storage section moving past the coil 44 is recorded in the channel 22.

After the indications have been provided in the channel 22 for the 48th pulse position of each integrator storage section, Integrator "1" becomes available for computation a second time. As the drum rotates through the first 22 positions for the integrator, the output indications for the 22 integrators move in sequence past the coil 46. This causes the output indications to become available for determining the sign of the Δx increment and of each Δy increment for the integrator during the second computation. The determination of sign for the Δx increment and for each Δy increment is made in a manner similar to that disclosed above. In like manner, the output from the 48th position of the 22 integrators is made available to each integrator as it is presented for computation.

The construction and operation of the above digital differential analyzer is fully disclosed in co-pending application Serial No. 217,478, filed March 26, 1951, by Floyd G. Steele and William F. Collison. It is disclosed and illustrated in somewhat abbreviated form in this application to serve as a basis for the disclosure of the new features included in the invention represented by this application.

In addition to the channels 18, 20, 22 and 24 forming a part of the analyzer disclosed above, the channel 16 is also included to perform functions individual to this invention. The channel 16 is coded in a manner similar to the coding provided in the channel 18. Thus, the channel 16 is divided into 22 integrator storage sections each having 48 pulse positions. The first 22 positions in each integrator storage section are used to provide a code for controlling the increments to be made in the number indicated in the channel 16 in the subsequent pulse positions for the integrator. Just as in the channel 18, a plurality of coding pulses may be provided in the channel 16 in the first 22 positions for each integrator so as to obtain a plurality of increments for the integrator every time that the integrator is presented for computation. For purposes of understanding, each increment in the channel 16 will be designated as ΔI.

The sign of each ΔI increment in the channel 16 is determined by the coincidence between the coding pulse in the channel 16 and an overflow pulse in the channel 22. A ΔI increment is positive when a pulse occurs in the channel 22 at the same time as the coding pulse in the channel 16, and the increment is negative when no pulse appears in the channel 22 at the same time as a coding pulse appears in the channel 16. In this manner, changes in the initial-condition signals, during repeated cycles of computation (successive trial runs) are programmed to be made in accordance with the results of computation, e.g. the overflows produced in channel 20. The sign of each ΔI increment for a particular integrator is determined by the coincidence circuit 86, which operates in a manner similar to the coincidence circuit 60. The counter 88 then determines the resultant value of all of the ΔI increments for the particular integrator in a manner similar to the counter 62 and converts this indication into binary form.

The stepping circuit 90 opens at the same time as the stepping circuit 64 to pass in sequence the resultant binary indications of ΔI stored in the counter 88. The indications of ΔI for each integrator are combined by the adder 92 with the indications of I provided in the pulse positions which are provided in the channel 16 after the 22nd position to indicate the numerical value of I for the integrator. Any carry of a number from one pulse position to the next pulse position is provided by the carry circuit 94, which operates in a manner similar to the carry circuit 70. The new value of I appearing after the 22nd pulse position for each integrator passes through the gate circuit 96 for recordation by the coil 28 in the channel 16. The gate circuit 96 operates in a manner similar to the gate circuit 72.

After the analyzer has operated through a plurality of cycles to generate the particular solution of a problem, the indications in the channel 18 representing the dependent quantity y for an integrator may overflow. As will be disclosed in detail hereinafter in the discussion of the solution of the problem shown in Figure 6, when an overflow occurs by exceeding the capacity of any one of certain integrator storage sections, the adder 68 produces a pulse at pulse position 48 of the integrator. This pulse passes through the gate circuit 102 and causes the normally non-conductive left tube in the multivibrator 98 to start conducting.

When the left tube in the multivibrator 98 starts to conduct, voltage on the plate of the tube becomes relatively low. Upon a flow of current through the left tube in the multivibrator 98, the right tube in the multivibrator becomes cut off and a relatively high voltage is produced on its plate. This voltage is introduced to the gate circuit 104 to prepare the circuit for operation at the beginning of the next computation. At the beginning of the next computation, a signal is introduced to the gate circuit at the first pulse position of Integrator "1" because of the connections from the counters 58 and 106 to the gate circuit. This signal passes through the gate circuit 104 and triggers the right tube in the multivibrator 108 into a state of conductivity. When the right tube in the multivibrator 108 starts to conduct, a relatively low voltage is produced on its plate. This voltage is introduced to the gate circuits 72, 80 and 96 to prevent information from passing through the gate circuits to the coils 34, 40 and 28, respectively.

During the time that the right tube in the multivibrator 108 is conducting, the left tube in the multivibrator is cut off. The resultant high voltage on the plate of the left tube in the multivibrator 108 is introduced to the gate circuit 110 to prepare the gate circuit for operation. Because of the particular connections from the counter 58 to the gate circuit 110, the gate circuit 110 becomes opened for the passage of information after the 22nd pulse position for each integrator. As previously disclosed, the pulse positions after the 22nd position for each integrator provide an indication in binary form in the channels 18 and 20 of the values of the dependent and output quantities for the integrator.

When the gate circuit 110 opens, the indications of the value of the initial condition I for each integrator pass from the coil 26 through the gate circuit to the coil 34 for recordation in the channel 18. By recording in the channel 18 the value of I for each integrator, the initial value of the dependent quantity y for each integrator is provided at the beginning of the computation. In like manner, the indications of the value of the initial condition I for each integrator passes from the coil 26 through the gate circuit 110 to the coil 28 so as to be recorded again in the channel 16.

At the same time that the gate circuit 104 opens for the passage of a signal to the multivibrator 108, it introduces a signal to the grid of the right tube in the flip-flop multivibrator 98. This signal causes the right tube in the multivibrator 98 to start conducting and a relatively low voltage to be produced on the plate of the tube. This low voltage is introduced to the gate circuit 104 to prevent any future signals from pasing through the gate circuit. When the right tube in the multivibrator 98 becomes conductive, the left multivibrator tube becomes cut off and a relatively high voltage is produced on its plate. This voltage is introduced to the gate circuit 100 to prepare the circuit for operation.

After the drum 10 has rotated through all of the integrators so that the information for each integrator has been transferred from the coils 26 to the coils 28 and 34, the first pulse position of Integrator "1" is again presented for computation. At this instant, the gate circuit 100 opens and passes a signal to the grid of the left tube in the multivibrator 108 to trigger the tube into a state of conductivity. The resultant low voltage on the plate of the left tube in the multivibrator 108 closes the gate circuit 110 and prevents any further information from passing from the coil 26 through the gate circuit to the coils 28 and 34.

At the same time that the left tube in the multivibrator 108 becomes conductive, the right tube in the multivibrator becomes cut off, causing a relatively high voltage to be produced on the tube plate. This high voltage is introduced to the gate circuits 72, 80 and 96 to open the gate circuits for the passage of information from the adders 68, 76 and 92, respectively. The digital differential analyzer then operates in a manner similar to that previously disclosed to obtain a new computation for the particular solution of the problem in question.

The operation of the multivibrator 98 and of the gate circuits 100 and 104 is similar to the operation of members which are shown in Figures 47 and 48 and disclosed in the specification of co-pending application Serial No. 217,478, filed March 26, 1951, by Floyd G. Steele and William F. Collison. By the operation of the multivibrator 98 and the gate circuits 100 and 104, the information in the channel 16 relating to the value of I for each integrator is transferred to the channel 18 at the beginning of each computation. This causes the value of I obtained for each integrator at the end of a computation to become the initial value of the dependent quantity y for the integrator in the next computation. In this way, successive trial runs can be made in which initial conditions at the beginning of each computation are systematically adjusted until the conditions specified as part of the particular problem are satisfied.

The operation of the apparatus disclosed above in determining the proper initial conditions for the correct solution of a problem can be clearly seen by an analysis of the differential problem $$\frac{d^2y}{dx^2} = ax + e^y + c$$

where $a$ and $c$ are constants. In the problem, $$\frac{dy}{dx} = -b$$

when $x=0$ and $y=0$ when $$\frac{dy}{dx} = 0$$

where $b$ is a constant. The integrator set-up for obtaining a plurality of particular solutions to the problem $$\frac{d^2y}{dx^2} = ax + e^y + c$$

is illustrated by the boxes 130, 132, 134, 136 and 138 in Figure 6. These boxes represent integrators, which in the above-described embodiment of the present invention actually consist of an integrator storage section (arc on the drum 10) and a time-shared computer system. In considering the operation of the system to solve a problem it is difficult to refer to the actual structure. Rather, a preferred manner of considering the problem is to employ the boxes of Figure 6 to represent integrators which are not easily defined as discrete operating elements in the illustrative embodiment. Of course the function of each of the boxes of Figure 6 coincides to the function of the integrators of the illustrative embodiment, so that the boxes provide solutions by integration. These particular solutions can be obtained by the analyzer shown in Figure 1 without any necessity for using the channel 16 and the components associated with the channel, provided that the curves that are obtained do not have to satisfy conditions such as those specified above for certain points on the curve. For example, the particular solutions would not have to satisfy the conditions that $$\frac{dy}{dx} = -b$$

when $x=0$ or that $y=0$ when $$\frac{dy}{dx} = 0$$

Figure 7:
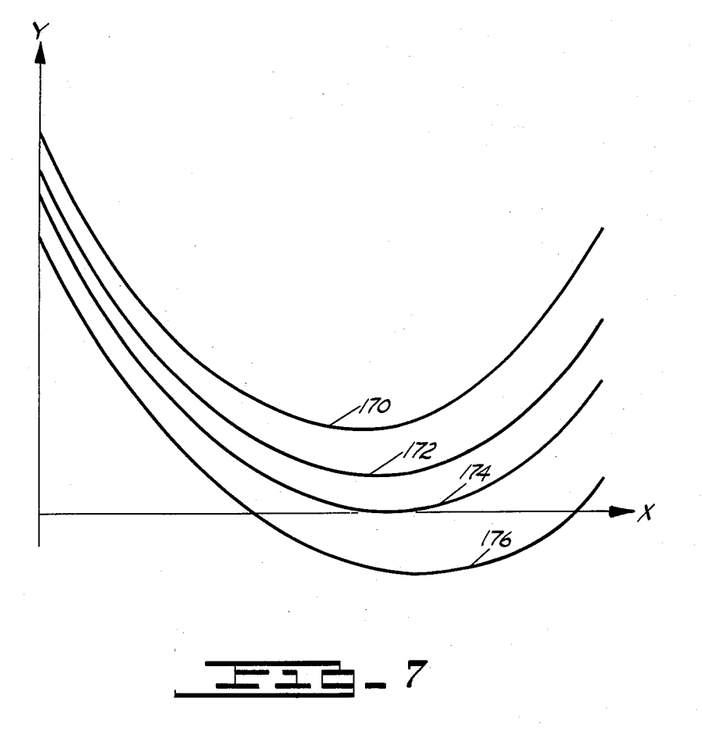
Figure 7 shows a group of curves illustrating some particular solutions of the problem shown in Figure 6.

A plurality of curves satisfying some of these particular solutions are illustrated at 170, 172, 174 and 176 in Figure 7. It will be appreciated that a number of other curves showing particular solutions of the problem can be generated.

Sometimes it is desired to obtain the solution represented by a particular curve out of a plurality of curves such as those shown in Figure 7. For example, if the conditions that $$\frac{dy}{dx}$$

must equal $-b$ when $x=0$ and that $y$ must equal 0 when $$\frac{dy}{dx} = 0$$

are specified for the above problem, only the curve 174 in Figure 7 will satisfy these conditions. In order to obtain the solution represented by the curve 174, it is first necessary to obtain a complete set of values of $y$, $x$ and $$\frac{dy}{dx}$$

for a point on the curve. The simplest way of obtaining a complete set of conditions for a point on the curve is to determine the value of $y$ at $x=0$ or the value of $x$ at $y=0$, since the values of the other conditions at these two points are known. Probably it is easier to determine the value of $y$ at $x=0$ than to determine the value of $x$ at $y=0$ since this is the first point on the curve. The channel 16 and the members associated with the channel are employed in combination with the other members shown in Figure 1 to determine the value of $y$ when $x=0$.

In addition to the integrators 130, 132, 134, 136 and 138, the integrators 140, 142 and 144 are also employed to obtain the correct determination of $y$ at $x=0$. The integrators 140, 142 and 144 are set up in a manner similar to the integrators 130, 132, 134, 136 and 138. As previously disclosed, $\Delta x$ increments are shown as being introduced to each integrator through a line extending to the upper right portion of the box which represents the integrator. Similarly, $\Delta y$ increments are represented as being introduced to the integrator through a line or lines extending to the lower right portion of the appropriate box. The output of $y\Delta x$ for the integrator is represented as being obtained from a line extending from the middle right portion of the appropriate box. In addition, $\Delta I$ increments for certain of the integrators are represented as being made by a line extending to the upper left portions of the appropriate boxes.

In the solution of the particular problem represented by the integrator interrelationship shown in Figure 6, the value of the constant $a$ representing the initial value of the dependent quantity $y$ for the integrator 130 is inserted into the channel 16 at the appropriate pulse positions i.e., the pulse positions defining the integrator storage of integrator 130. This insertion is made before the beginning of a computation and is illustrated at 178 in the upper left corner of the box representing the integrator 130. The value of the constant $(-b)$ representing the initial value of the quantity $$\frac{dy}{dx}$$

for the integrator 134 is also inserted into the channel 16 at the appropriate pulse positions i.e. the storage of channel 16 defined as integrator 134, before the beginning of a computation. The insertion is made because one of the conditions specified for the problem is that $$\frac{dy}{dx} = -b$$

at $x=0$.

Similarly, a value of $E-b$ is initially inserted into appropriate positions or digit registers of integrator 136, in the channel 16 as the initial value of the dependent quantity $y$ for the integrator 136. Since E represents the value at which an overflow occurs in the channel 18 for the integrator 136, the value $E-b$ is initially inserted into the channel 16 for the integrator so that an overflow will occur when the number of pulses added into the channel 16 for the integrator equals $b$. This represents a change in the value of $$\frac{dy}{dx}$$

from $-b$ to 0 corresponding to the difference in the values of $$\frac{dy}{dx}$$

at the two points where the values of $x$ and $y$ are partially known. As will be disclosed in detail hereafter, an overflow is desired at $$\frac{dy}{dx}=0$$

to determine if the particular solution of the problem has been obtained to give the proper value that $y=0$ at this point.

Best estimates of initial values are made for other integrators involved in the particular solution of the problem and these values are inserted in the channel 16 in the appropriate positions for the integrator. For example, initial values are assumed for the dependent quantity $y$ for the integrators 132 and 140 and are inserted into the channel 16 in the appropriate positions for the respective integrators. As will be disclosed in detail hereinafter, these values are automatically revised during successive trial runs until the correct values are obtained.

A trial run is then initiated. As the computation proceeds, the output indications from certain integrators are introduced to the dependent quantity $y$ for other integrators in accordance with the integrator set-up shown in Figure 6. For example, output indications from the integrator 132 are introduced to appropriate pulse positions in the channel 18 to vary the value of the dependent quantity $y$ for the integrators 134 and 136. For example, output indications from the integrator 132 (as pulses produced by the adder 76 at the 48th pulse position of the computation of integrator 132 as previously described) are recorded in channel 22 and serve to control the value of the dependent quantity of the integrators 134 and 136. Similarly, output indications for certain integrators are used to vary the value of I for other integrators. For example, the output indications from the integrator 144 are introduced to appropriate pulse positions in the storage for integrators 132 and 138, in the channel 16 to vary the value of I for the integrators 132 and 138 and to vary the value of I for the integrator 144 itself.

During the computation, increments of the output quantity from the integrator 132 are introduced to the dependent quantity $y$ for the integrator 136. Since the output from the integrator 132 represents increments of $$\frac{dy}{dx}$$

the value of the dependent quantity $y$ for the integrator 136 changes from its initial value of $E-b$ as the computation proceeds. When $$\frac{dy}{dx} \text{ becomes } 0$$

the value of the dependent quantity $y$ for the integrator 136 becomes E because of a change from $-b$ to 0 in the slope of the curves shown in Figure 7. As previously disclosed, an overflow occurs in the channel 18 when the value of the dependent quantity $y$ for the integrator 136 reaches the value of E.

The overflow of the dependent quantity $y$ for the integrator 136 produces a signal which causes the apparatus shown in Figure 1 to discontinue its trial run. This trial run is discontinued because an overflow in the indications of the dependent quantity $y$ for an integrator prevents the correct value of $y$ from thereafter being utilized to obtain an accurate solution of a problem. As previously disclosed, the dependent quantity for each integrator should normally be so scaled that no overflow will ever occur during the solution of a problem.

The circuitry for discontinuing the operation of the analyzer upon the occurrence of an overflow in a dependent quantity $y$ is fully disclosed in co-pending application Serial No. 217,478, filed March 26, 1951, by Floyd G. Steele and William F. Collison. As disclosed in the co-pending application, one of the conditions for stopping the computation upon the occurrence of an overflow pulse in the 48th position for an integrator is that a pulse should not be initially inserted in the channel 18 in the 48th pulse position for the integrator. Thus, upon the initial insertion of a pulse in the 48th position for an integrator, an overflow in the value of $y$ for the integrator will not stop the computation. For example, a pulse is inserted in the channel 18 in the 48th position for the integrator 140 so that the computation will continue even if the indications in the channel 18 of the dependent quantity $y$ for the integrator should overflow.

Computation does not stop for an overflow of the dependent quantity $y$ for the integrator 140 since the dependent quantity represents the error in the value of $y$ for the particular solution that is desired for the problem. As may be seen in Figure 7, the error in the value of $y$ may be negative if the particular solution 176 is obtained during a trial run. Since the error in the value of $y$ may become negative before the value of $$\frac{dy}{dx} \text{ becomes } 0$$

and since it is desired to continue computation until $$\frac{dy}{dx} \text{ becomes } 0$$

the integrator 140 is coded (by recording a pulse in the 48th pulse position of channel 18 thereof, as disclosed in the above-identified Steele-Collison system) so that computation will continue even after the error in the value of $y$, as represented by the output from the integrator 140, starts to become negative.

At the beginning of the next trial run, the initial value I of the dependent quantities for the different integrators are automatically inserted into the channel 18. The insertion of the values of I as the initial values for the dependent quantities $y$ for the different integrators is controlled by the multivibrator 98 and the gate circuits 100, 104 and 108 in a manner which has been previously disclosed in detail. The initial values I are inserted during the first cycle of the new trial run, and after the insertion of these values the computation involved in the trial run is commenced.

After the first cycle of operation in the trial run, the analyzer starts to provide another computation for the solution of the problem. This computation provides values closer to the correct values for the initial conditions than those provided in the first computation. The values of the initial conditions are closer because of the transfer of the values of I for the different integrators to the channel 18 for use as the initial value of the dependent quantities $y$ for the integrators.

In order to insure that the particular solution of the problem will be obtained in a minimum number of trial runs, the integrator 142 is provided. The integrator 142 multiplies the value of $y$ at $$\frac{dy}{dx}=0$$

by a factor of $m$ which is less than 1. The integrator 142 then introduces this fractional value of $y$ to the channel 16 as the correction to the initial value of the dependent quantity $y$ for the integrator 140. Since the value of $y$ introduced to the integrator 142 at $$\frac{dy}{dx}=0$$

represents the actual error in the value of $y$, multiplying this value by a fraction less than one causes the errors in the value of $y$ in successive trial runs to be damped. By damping the errors in the value of $y$ in successive trial runs, the initial value of $y$ satisfying the particular solution of the problem is quickly obtained. Specifically, the value of $m$ is fractional and the value of $y$ introduced to the integrator 142 is applied as a $dx$ input value of one. Therefore, each occurrence of the value $y$ causes the fractional value $m$ to be transferred to the R register of the integrator, which periodically overflows to provide increments of the value Y0. In this manner the indicated error values are damped to enable a continuous approach to the desired solution.

It should be appreciated that the apparatus disclosed above can be used for other purposes than to determine a complete set of conditions at a point and to obtain a particular solution at the point. For example, the apparatus may be used to vary one parameter in a function in repeated integrations of the function. In this way, a problem involving a double integral, such as $\int\int f(x,y)dxdy$, can be solved.

It should be further appreciated that the apparatus disclosed above can be easily adapted for use with other digital differential analyzers than that disclosed in co-pending application Serial No. 217,478, filed March 26, 1951, by Floyd G. Steele and William F. Collison. For example, the apparatus can be easily adapted for use with the digital differential analyzer disclosed in co-pending application Serial No. 263,152, filed December 27, 1951, by Glenn E. Hagen et al., now Patent No. 2,850,232.

Although this invention has been disclosed and illustrated with reference to particular applications, the principles involved are susceptible of numerous other applications which will be apparent to persons skilled in the art. The invention, therefore, is to be limited only as indicated by the scope of the appended claims.

What is claimed is:

1. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and another quantity registered in said first accumulator; said analyzer further comprising register means for registering a plurality of second signal indications representative of initial values of quantities of said mathematical function; means for varying the signal indications in said register means under control of signal representations formed in said integrators; and means for selectively transferring signal indications from said register means into certain of said accumulators to alter the values registered therein.

2. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and another quantity registered in said first accumulator; each of said digital integrators further including means to form overflow signal indications, indicating that the value registered in said second accumulator has exceeded a predetermined value; said analyzer further comprising register means for registering a plurality of second signal indications representative of initial values of quantities of said mathematical function; means for varying signal indications in said register means under control of said overflow signal indications; and means for selectively transferring signal indications from said register means into predetermined of said accumulators to alter the values registered therein.

3. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and another quantity registered in said first accumulator; each of said digital integrators further including means to form overflow signal indications, indicating that the value registered in said second accumulator has exceeded a predetermined value; said analyzer further comprising register means associated with each of said digital accumulators for registering a plurality of second signal indications representative of initial values of quantities of said mathematical function; means for varying said second signal indications registered in said register means under control of said overflow signal indications; and means for selectively transferring said second signal indications from said register means into said accumulators under control of signals accumulated in one of said accumulators whereby to alter the value registered in said accumulators.

4. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and another quantity registered in said first accumulator; each of said digital integrators further including means to form overflow signal indications, indicating that the value registered in said second accumulator has exceeded a predetermined value; said analyzer further comprising register means associated with each of said digital accumulators for registering a plurality of second signal indications representative of initial values of quantities of said mathematical function; means for varying said second signal indications in said register means under control of said overflow signal indications; and means for selectively transferring said second signal indications into said first accumulators of said integrators to alter the values registered therein.

5. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and an other quantity registered in said first accumulator; said analyzer further comprising register means for registering a plurality of second signal indications representative of initial values of quantities of said mathematical function; means for varying said second signal indications in said register means under control of signal representations formed in said integrators; control means for controlling the operating interval of said integrators; and means for selectively transferring said second signal indications from said register means into said accumulators during an interval other than said operating interval of said integrators whereby to alter the value registered in said accumulators.

6. Apparatus according to claim 5 wherein said control means is controlled by signal indications in certain of said integrators.

7. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and an other quantity registered in said first accumulator; each of said digital integrators further including means to form overflow signal indications, indicating that the value registered in said second accumulator has exceeded a predetermined value; said analyzer further comprising register means associated with each of said digital accumulators of each of said integrators for registering a plurality of second signal indications representative of integral values of quantities of said mathematical function; means for varying said second signal indications in said register means under control of said overflow signal indications; control means for controlling the operating interval of said integrators; and means for selectively transferring said second signal indications from said register means into said accumulators during an interval other than said operating interval of said integrators whereby to alter the value registered in said accumulators.

8. A differential analyzer comprising: a plurality of digital integrators each comprising a first accumulator, and a second accumulator and each further including transfer means adapted to receive first signal indications representative of variations in one quantity of a mathematical function, said transfer means functioning upon each occurrence of said first signal indications indicating a variation in said one quantity to form and register signal indications in said second accumulator representative of the product of said variations in said one quantity and an other quantity registered in said first accumulator; each of said digital integrators further including means to form overflow signal indications, indicating that the value registered in said second accumulator has exceeded a predetermined value; said analyzer further comprising register means associated with each of said digital accumulators for registering a plurality of second signal indications representative of initial values of quantities of said mathematical function; means for varying said second signal indications in said register means under control of said overflow signal indications; control means for controlling the operating interval of said integrators; and means for selectively transferring said second signal indications from said register means into said first accumulators during an interval other than said operating interval of said integrators whereby to vary the value registered in an accumulator.

9. A differential analyzer comprising: storage means for registering signal representations, representative of a plurality of numerical values; means for sensing first signal representations registered in said storage means representative of a dependent quantity of a mathematical function; means for varying said first representations in accordance with variations of said dependent quantity; means adapted to receive second signal representations, representative of variations in an independent quantity of said mathematical function; means for sensing third signal representations registered in said storage means, representative of a combination of said dependent quantity and variations in said independent quantity; means connected to receive said first and said second signal representations for forming fourth signal representations, representative of the product of said dependent quantity and said variations in said independent quantity; means connected to receive said third and said fourth signal representations for forming fifth signal representations, representative of the accumulation of the quantities represented by said third and said fourth signal representations; means for returning said first and said fifth signal representations to said storage means; means for sensing sixth signal representations registered in said storage means, representative of initial values for certain quantities of said mathematical function; signal controlled means for varying said sixth signal representations; and means for transferring said sixth signal representations from one position to another within said storage means.

10. A differential analyzer comprising: storage means for registering signal representation, representative of a plurality of numerical values; means for sensing signal representations registered in said storage means representative of a dependent quantity of a mathematical function; means for varying said first representations in accordance with variations of said dependent quantity; means adapted to receive second signal representations, representative of variations in an independent quantity of said mathematical function; means for sensing third signal representations registered in said storage means, representative of a combination of said dependent quantity and variations in said independent quantity; means connected to receive said first and said second signal representations for forming fourth signal representations, representative of the product of said dependent quantity and said variations in said independent quantity; means connected to receive said third and said fourth signal representations for forming fifth signal representations, representative of the accumulation of the quantities represented by said third and said fourth signal representations; means for returning said first and said fifth signal representations to said storage means; means for sensing sixth signal representations registered in said storage means, representative of initial values for certain quantities of said mathematical function; means for varying said sixth signal representations under control of certain of said signal representations; means for returning said sixth signal representations to different locations in said storage means.

11. A differential analyzer comprising: storage means for registering signal representations, representative of a plurality of numerical values; means for sensing first signal representations registered in said storage means representative of a dependent quantity of a mathematical function; means for varying said first representations in accordance with variations of said dependent quantity; means adapted to receive second signal representations, representative of variations in an independent quantity of said mathematical function; means for sensing third signal representations registered in said storage means, representative of a combination of said dependent quantity and variations in said independent quantity; means connected to receive said first and said second signal representations for forming fourth signal representations, representative of the product of said dependent quantity and said variations in said independent quantity; means connected to receive said third and said fourth signal representations for forming fifth signal representations, representative of the accumulation of the quantities represented by said third and said fourth signal representations; means for returning said first and said fifth signal representations to said storage means; means for sensing sixth signal representations registered in said storage means, representative of initial values for certain quantities of said mathematical function; means for varying said sixth signal representations under control of said fifth signal representations; and means for transferring said sixth signal representations within said storage means to locations of said first signal representations.

12. A digital differential analyzer, including, means for providing a plurality of integrator storage sections, means for sequentially sensing the integrator storage sections, means including electrical circuitry for providing signal indications digitally representing an independent quantity from each integrator storage section, means including electrical circuitry for providing signal indications digitally representing a dependent quantity from each integrator storage section, means including electrical circuitry for differentially combining the signal indications representing the independent and dependent quantities from each integrator storage section, means including electrical circuitry for providing signal indications digitally representing the differential combination from each integrator storage section, means including electrical circuitry for providing signal indications digitally representing initial values of the dependent quantities for particular integrator storage sections, means including electrical circuitry for varying the signal indications digitally representing the initial values in accordance with the signal indications digitally representing the differential combination of different integrator storage sections dependent upon the problem to be solved, and means including electrical circuitry operative upon the completion of each computation to replace the signal indications representing the dependent quantity from the particular integrator storage sections by the signal indications representing the initial values of the dependent quantities for the particular integrator storage sections until the problem is solved.

13. A digital differential analyzer, including, means for providing a plurality of integrator storage sections, means for sequentially sensing the integrator storage sections, means for providing signal indications digitally representing an independent quantity for each integrator storage section, means for providing signal indications digitally representing a dependent quantity for each integrator storage section, means for differentially combining the signal indications representing the independent and dependent quantities from each integrator storage section to obtain signal indications digitally representing an output quantity for the integrator storage section, means for providing signal indications digitally representing an overflow in the signal indications representing the output quantity for each integrator, means for providing signal indications digitally representing initial values of the dependent quantities for particular integrator storage sections, means for varying the signal indications representing the initial values of the dependent quantities upon the sensing of the integrator storage sections and in accordance with the signal indications representing the overflows in the output quantity for different integrator storage sections in the plurality dependent upon the problem to be solved, means for interrupting the computation and for subsequently providing for a resumption of computation, and means including electrical circuitry for cancelling the signal indications representing the dependent quantity for the particular integrator storage sections upon each resumption of computation and for substituting the signal indications representing the initial values of the dependent quantity for the particular integrator storage sections until the problem is solved.

14. A digital differential analyzer, including, memory means for providing a plurality of integrator storage sections, first read and record means associated with the memory means to provide a first channel in the memory means, second read and record means associated with the memory means to provide a second channel in the memory means, third read and record means associated with the memory means to provide a third channel in the memory means, means for scanning said memory means with said read and record means electrical circuitry associated with the first read and record means to provide in the first channel signal indications digitally representing a dependent quantity for each integrator storage section, means including electrical circuitry for providing signal indications digitally representing an independent quantity for each integrator storage section, electrical circuitry associated with the second read and record means to provide in the second channel signal indications digitally representing the differential combination of the independent and dependent quantities for each integrator storage section, electrical circuitry associated with the third read and record means to provide in the third channel signal indications digitally representing the initial values of the dependent quantities for particular integrator storage sections in the plurality, electrical circuitry for varying the signal indications in the third channel in accordance with the signal indications in the second channel, electrical circuitry for interrupting the computation upon the occurrence of signal indications representing a particular value for one of the quantities being computed in the analyzer, and electrical circuitry for substituting the signal indications in the third channel for the particular integrator storage sections for the signal indications in the first channel upon each interruption in the computation and until the problem is solved.

15. A digital differential analyzer, including, memory means for providing a plurality of integrator storage sections, first read and record means associated with the memory means to provide a first channel in the memory means, second read and record means associated with the memory means to provide a second channel in the memory means, third read and record means associated with the memory means to provide a third channel in the memory means, fourth read and record means associated with the memory means to provide a fourth channel in the memory means, means to scan said memory means with said read and record means, electrical circuitry associated with the first read and record means to provide in the first channel signal indications digitally representing a dependent quantity for each integrator storage section, means including electrical circuitry for providing signal indications digitally representing an independent quantity for each integrator storage section, electrical circuitry associated with the second read and record means to provide in the second channel signal indications digitally representing the differential combination of the independent and dependent quantities for each integrator storage section, electrical circuitry associated with the third read and record means to provide in the third channel signal indications digitally representing an overflow in the signal indications in the second channel of each integrator storage section, electrical circuitry associated with the fourth read and record means to provide in the fourth channel signal indications digitally representing the initial values of the dependent quantity for particular integrator storage sections in the plurality, electrical circuitry for varying the signal indications in the fourth channel in accordance with the signal indications in the third channel for different integrator storage sections dependent upon the problem to be solved, and electrical circuitry for replacing the signal indications in the first channel by the signal indications in the fourth channel at particular instants until the solution of the problem has been obtained.

References Cited in the file of this patent
UNITED STATES PATENTS
2,749,037     Stibitz _______________ June 5, 1956